(12) United States Patent
Cheng et al.

(10) Patent No.: US 10,491,348 B2
(45) Date of Patent: Nov. 26, 2019

(54) METHODS AND NODES FOR DETERMINING A TRANSMISSION DATA BLOCK SIZE

(71) Applicant: TELEFONAKTIEBOLAGET LM ERICSSON (PUBL), Stockholm (SE)

(72) Inventors: Jung-Fu Cheng, Fremont, CA (US); Yufei Blankenship, Kildeer, IL (US); Dongsheng Yu, Ottawa (CA)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 16/226,346

(22) Filed: Dec. 19, 2018

(65) Prior Publication Data

US 2019/0149287 A1    May 16, 2019

Related U.S. Application Data

(63) Continuation of application No. PCT/IB2018/051873, filed on Mar. 20, 2018.

(60) Provisional application No. 62/473,839, filed on Mar. 20, 2017.

(51) Int. Cl.
*H04L 5/00* (2006.01)
*H04L 5/14* (2006.01)
*H04L 1/00* (2006.01)

(52) U.S. Cl.
CPC .......... *H04L 5/0044* (2013.01); *H04L 1/0003* (2013.01); *H04L 1/0009* (2013.01); *H04L 1/0016* (2013.01); *H04L 5/0092* (2013.01); *H04L 5/14* (2013.01)

(58) Field of Classification Search
CPC ....... H04L 5/0044; H04L 5/14; H04L 1/0003; H04L 5/0092; H04L 1/0016; H04L 1/0009
See application file for complete search history.

(56) References Cited

U.S. PATENT DOCUMENTS

| | | |
|---|---|---|
| 2013/0308504 A1 | 11/2013 | Nimbalker et al. |
| 2014/0313985 A1 | 10/2014 | Nimbalker et al. |
| 2019/0068318 A1* | 2/2019 | Marinier ............... H04L 1/0065 |

OTHER PUBLICATIONS

International Search Report for PCT/IB2018/051873, dated Jun. 15, 2018; 5 pages.

* cited by examiner

*Primary Examiner* — Robert M Morlan
*Assistant Examiner* — Wilfred Thomas
(74) *Attorney, Agent, or Firm* — Ericsson Inc.

(57) ABSTRACT

A method in a User Equipment (UE) for determining a transmission data block size is provided. The method comprises: obtaining parameters for a data transmission, the parameters including at least a number of layers, a number of allocated resource blocks, a modulation order and a code rate; determining an effective number of resource elements; determining a transmission data block size based on the obtained parameters and the determined effective number of resource elements; and performing one of transmitting and receiving data based on the determined transmission data block size.

28 Claims, 12 Drawing Sheets

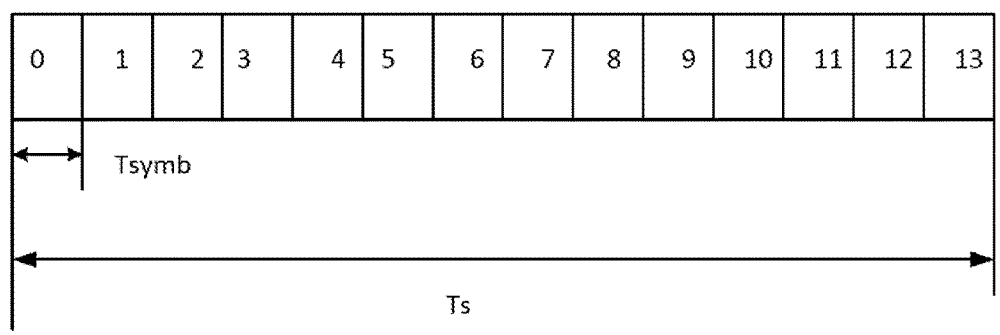
Fig. 1a- Slot

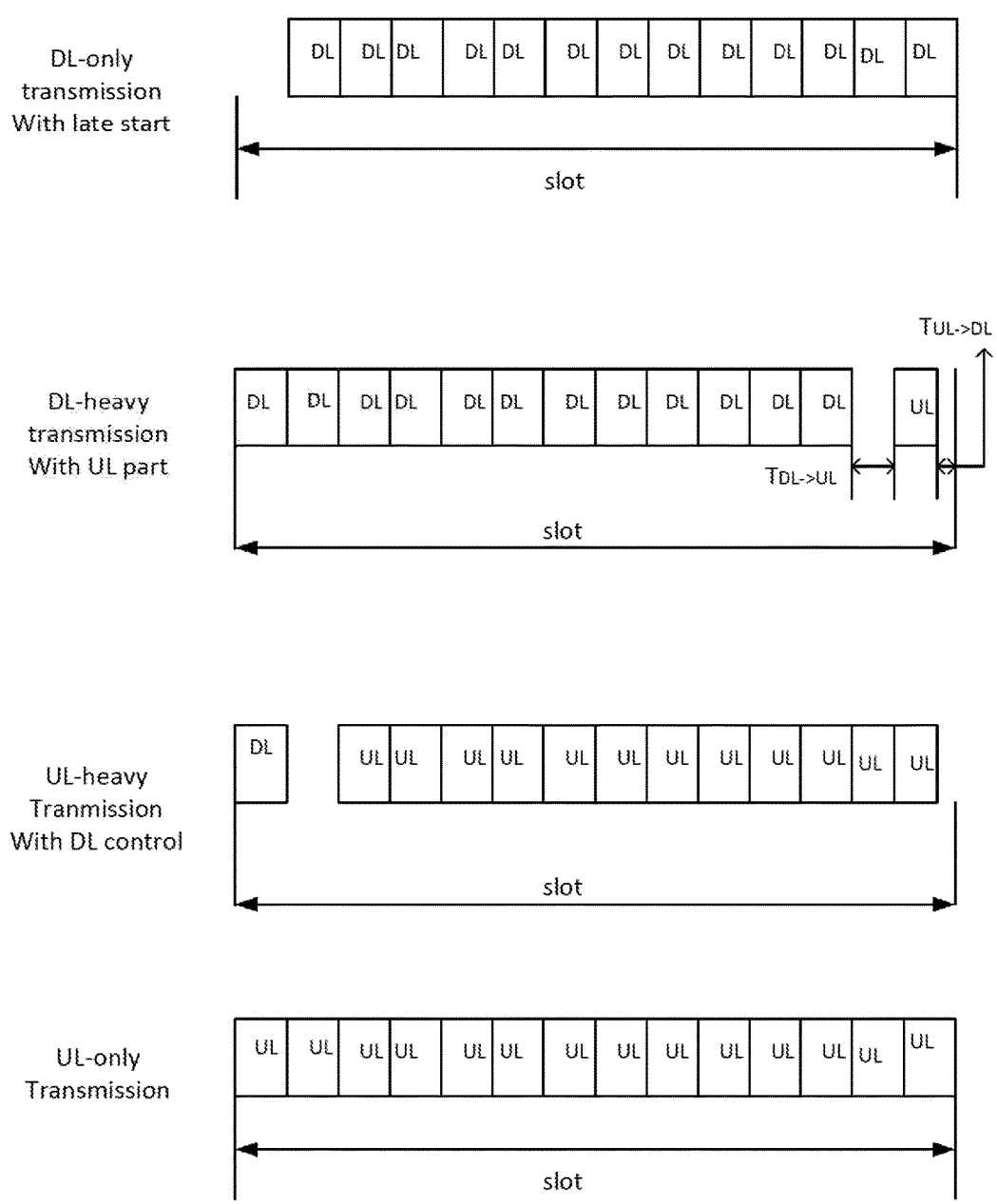
Fig. 1b -Slot variations

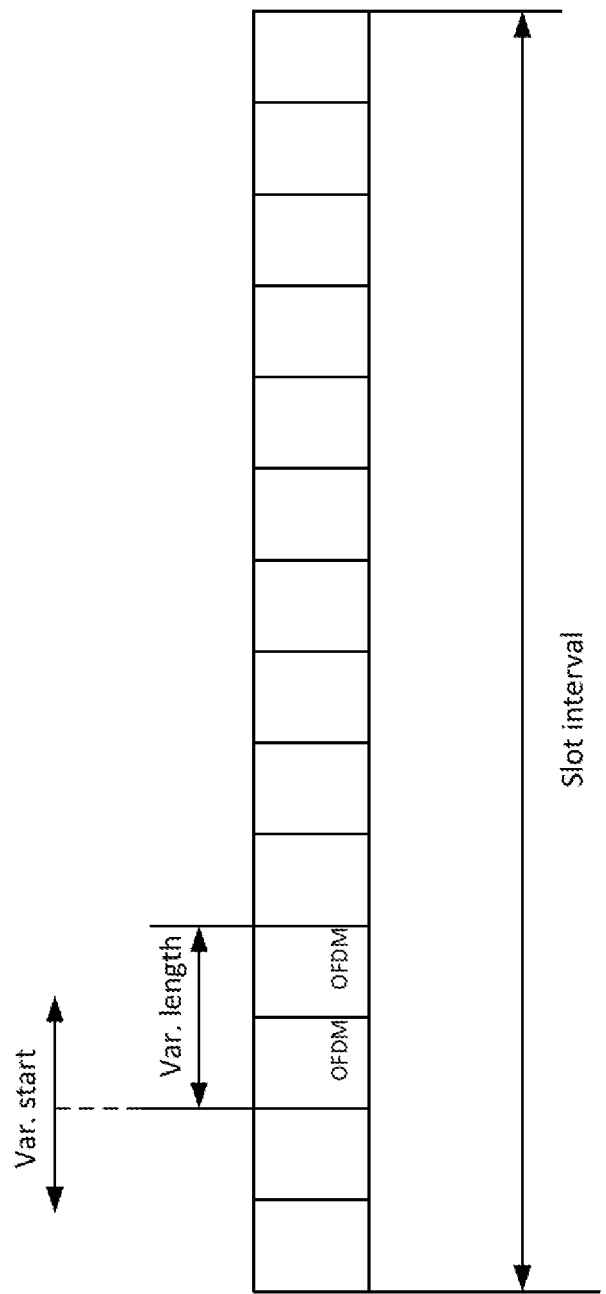
Fig. 1c-Mini slot with 2OFDM symbols

Fig. 3 (method for a radio node, e. g. a wireless device)

Fig. 4 (method at a first radio node, e.g. a network node)

Table 4 Code rate with different number of OFDM symbols for data transmission in LTE

| MCS index ($I_{MCS}$) | Modulation | Available number of OFDM symbols for PDSCH ($N_{OS}$) | | | | | | | | |
|---|---|---|---|---|---|---|---|---|---|---|
| | | 13 | 12 | 11 | 10 | 9 | 8 | 7 | 6 | 5 |
| 0 | QPSK | 0.10 | 0.11 | 0.12 | 0.13 | 0.14 | 0.16 | 0.18 | 0.21 | 0.25 |
| 1 | QPSK | 0.13 | 0.14 | 0.16 | 0.17 | 0.19 | 0.21 | 0.24 | 0.28 | 0.34 |
| 2 | QPSK | 0.16 | 0.17 | 0.19 | 0.21 | 0.23 | 0.26 | 0.30 | 0.35 | 0.42 |
| 3 | QPSK | 0.21 | 0.22 | 0.25 | 0.27 | 0.30 | 0.34 | 0.39 | 0.45 | 0.54 |
| 4 | QPSK | 0.25 | 0.28 | 0.30 | 0.33 | 0.37 | 0.41 | 0.47 | 0.55 | 0.66 |
| 5 | QPSK | 0.31 | 0.34 | 0.37 | 0.41 | 0.45 | 0.51 | 0.58 | 0.68 | 0.81 |
| 6 | QPSK | 0.37 | 0.40 | 0.44 | 0.48 | 0.54 | 0.61 | 0.69 | 0.81 | 0.97 |
| 7 | QPSK | 0.44 | 0.47 | 0.52 | 0.57 | 0.63 | 0.71 | 0.81 | 0.94 | 1.13 |
| 8 | QPSK | 0.50 | 0.54 | 0.59 | 0.65 | 0.72 | 0.81 | 0.93 | 1.08 | 1.30 |
| 9 | QPSK | 0.56 | 0.61 | 0.67 | 0.73 | 0.81 | 0.91 | 1.05 | 1.22 | 1.46 |
| 10 | 16QAM | 0.28 | 0.30 | 0.33 | 0.37 | 0.41 | 0.46 | 0.52 | 0.61 | 0.73 |
| 11 | 16QAM | 0.31 | 0.34 | 0.37 | 0.41 | 0.45 | 0.51 | 0.58 | 0.68 | 0.81 |
| 12 | 16QAM | 0.36 | 0.39 | 0.43 | 0.47 | 0.52 | 0.58 | 0.67 | 0.78 | 0.94 |
| 13 | 16QAM | 0.40 | 0.44 | 0.48 | 0.53 | 0.58 | 0.66 | 0.75 | 0.88 | 1.05 |
| 14 | 16QAM | 0.46 | 0.50 | 0.54 | 0.59 | 0.66 | 0.74 | 0.85 | 0.99 | 1.19 |
| 15 | 16QAM | 0.51 | 0.55 | 0.60 | 0.66 | 0.74 | 0.83 | 0.95 | 1.10 | 1.33 |
| 16 | 16QAM | 0.54 | 0.59 | 0.64 | 0.71 | 0.79 | 0.88 | 1.01 | 1.18 | 1.41 |
| 17 | 64QAM | 0.36 | 0.39 | 0.43 | 0.47 | 0.52 | 0.59 | 0.67 | 0.79 | 0.94 |
| 18 | 64QAM | 0.39 | 0.42 | 0.46 | 0.50 | 0.56 | 0.63 | 0.72 | 0.83 | 1.00 |
| 19 | 64QAM | 0.43 | 0.46 | 0.51 | 0.56 | 0.62 | 0.69 | 0.79 | 0.93 | 1.11 |
| 20 | 64QAM | 0.47 | 0.51 | 0.55 | 0.61 | 0.68 | 0.76 | 0.87 | 1.01 | 1.22 |
| 21 | 64QAM | 0.51 | 0.55 | 0.60 | 0.66 | 0.74 | 0.83 | 0.95 | 1.10 | 1.32 |
| 22 | 64QAM | 0.55 | 0.60 | 0.65 | 0.72 | 0.79 | 0.89 | 1.02 | 1.19 | 1.43 |
| 23 | 64QAM | 0.59 | 0.64 | 0.70 | 0.77 | 0.86 | 0.96 | 1.10 | 1.29 | 1.54 |
| 24 | 64QAM | 0.64 | 0.69 | 0.75 | 0.83 | 0.92 | 1.04 | 1.18 | 1.38 | 1.66 |
| 25 | 64QAM | 0.68 | 0.74 | 0.80 | 0.88 | 0.98 | 1.10 | 1.26 | 1.47 | 1.77 |
| 26 | 64QAM | 0.72 | 0.78 | 0.85 | 0.94 | 1.04 | 1.17 | 1.34 | 1.56 | 1.88 |
| 27 | 64QAM | 0.75 | 0.81 | 0.89 | 0.98 | 1.09 | 1.22 | 1.40 | 1.63 | 1.95 |
| 28 | 64QAM | 0.88 | 0.95 | 1.04 | 1.15 | 1.27 | 1.43 | 1.64 | 1.91 | 2.29 |

*Fig. 12*

METHODS AND NODES FOR DETERMINING A TRANSMISSION DATA BLOCK SIZE

RELATED APPLICATIONS

The present application is a continuation of International Application No. PCT/IB2018/051873, filed on Mar. 20, 2018, entitled "Methods and nodes for determining a transmission data block size" which claims priority to and the benefit of the filing of U.S. Provisional Patent Application No. 62/473,839, entitled "Transmission Data Block Size Determination", and filed at the United States Patent and Trademark Office on Mar. 20, 2017, all of which are incorporated herein by reference in their entireties.

TECHNICAL FIELD

The present description generally relates to wireless communication systems and, in particular, to determining transmission data block size within such systems.

BACKGROUND

In 3GPP (Third Generation Partnership Project), there are studies on new protocols collectively referred to as new radio (NR) interface for 5G. Various terms are used in the art for this new and next generation technology. The terms NR and 5G are used in the present disclosure interchangeably. Moreover, a base-station can be referred to as gNB instead of eNB. Alternatively, the term Transmission-Receive-point (TRP) can also be used.

Slot Structure

An NR slot consists of several Orthogonal Frequency Division Multiplexing (OFDM) symbols, according to current agreements either 7 or 14 symbols per slot (for OFDM subcarrier spacing ≤60 kHz) or 14 symbols per slot (for OFDM subcarrier spacing >60 kHz). FIG. 1a shows a subframe with 14 OFDM symbols as an example. In FIG. 1a, $T_s$ and $T_{symb}$ denote the slot and OFDM symbol duration, respectively.

In addition, a slot may also be shortened to accommodate Downlink/Uplink (DL/UL) transient period or both DL and UL transmissions. Potential slot variations are shown in FIG. 1b. For example, FIG. 1b shows, from top to bottom, a slot with DL-only transmission with a late start, a slot with DL-heavy transmission with UL part, a slot with UL-heavy transmission with DL control and a slot with UL-only transmission.

Furthermore, NR also defines mini-slots. Mini-slots are shorter in time than slots (according to current agreements from 1 or 2 symbols up to the number of symbols in a slot minus one) and can start at any symbol. Mini-slots are used if the transmission duration of a slot is too long or the occurrence of the next slot start (slot alignment) is too late. Applications of mini-slots include, among others, latency critical transmissions (in this case both mini-slot length and frequent opportunity of mini-slot are important) and unlicensed spectrum where a transmission should start immediately after listen-before-talk succeeded (here the frequent opportunity of mini-slot is especially important). An example of mini-slots is shown in FIG. 1c (the exemplary mini slots are the OFDM symbols shown in FIG. 1c).

Control Information

PDCCHs (physical downlink control channels) are used in NR for downlink control information (DCI), e.g. downlink scheduling assignments and uplink scheduling grants. The PDCCHs are in general transmitted at the beginning of a slot and relate to data in the same or a later slot (for mini-slots PDCCH can also be transmitted within a regular slot). Different formats (sizes) of the PDCCHs are possible to handle different DCI payload sizes and different aggregation levels (i.e. different code rate for a given payload size). A UE is configured (implicitly and/or explicitly) to monitor (or search) for a number of PDCCH candidates of different aggregation levels and DCI payload sizes. Upon detecting a valid DCI message (i.e. the decoding of a candidate is successful and the DCI contains an Identity (ID) the UE is told to monitor) the UE follows the DCI (e.g. receives the corresponding downlink data or transmits in the uplink).

In NR concept discussions, the introduction of a 'broadcasted control channel' to be received by multiple UEs is considered. Such a channel has been referred to as 'group common PDCCH'. The exact content of such a channel is under discussion. One example of information that might be put in such a channel is information about the slot format, i.e. whether a certain slot is uplink or downlink, which portion of a slot is UL or DL; such information which could be useful, for example, in a dynamic TDD (Time Division Duplex) system.

Transmission Parameter Determination

In the Long Term Evolution (LTE) existent protocols, the downlink control information (DCI) carries several parameters to instruct the UE how to receive the downlink transmission or to transmit in the uplink. For example, the Frequency Division Duplex (FDD) LTE DCI format 1A carries parameter such as Localized/Distributed Virtual Resource Block (VRB) assignment flag, Resource block assignment, Modulation and coding scheme (MCS), HARQ process number, New data indicator, Redundancy version and TPC (Transmit Power Control) command for PUCCH (Physical Uplink Control Channel).

One of the key parameters for the UE to be able to receive or transmit in the system is the size of the data block (called transport block size (TBS)) to be channel coded and modulated. In LTE, this is determined as follows:

- The UE uses Modulation and coding scheme given by the DCI to read a transport block size (TBS) index $I_{TBS}$ from a modulation and coding scheme (MCS) table. An example of the MCS table is shown in Table 1.
- The UE determines the number of physical radio blocks (PRBs) as $N_{PRB}$ from the Resource block assignment given in the DCI.
- The UE uses the TBS index $I_{TBS}$ and the number of PRBs $N_{PRB}$ to read the actual transport block size from a TBS table. A portion of the TBS table is shown in Table 2 as an example.

TABLE 1

| LTE modulation and coding scheme (MCS) table | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |

TABLE 1-continued

LTE modulation and coding scheme (MCS) table

| MCS Index $I_{MCS}$ | Modulation Order $Q_m$ | TBS Index $I_{TBS}$ |
|---|---|---|
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

TABLE 2

LTE transport block size (TBS) table (dimension is 27 × 110)

| $I_{TBS}$ | $N_{PRB}$ | | | | | | | | |
|---|---|---|---|---|---|---|---|---|---|
| | 1 | 2 | 3 | 4 | 5 | 6 | 7 | 8 | 9 ... |
| 0 | 16 | 32 | 56 | 88 | 120 | 152 | 176 | 208 | 224 ... |
| 1 | 24 | 56 | 88 | 144 | 176 | 208 | 224 | 256 | 328 ... |
| 2 | 32 | 72 | 144 | 176 | 208 | 256 | 296 | 328 | 376 ... |
| 3 | 40 | 104 | 176 | 208 | 256 | 328 | 392 | 440 | 504 ... |
| 4 | 56 | 120 | 208 | 256 | 328 | 408 | 488 | 552 | 632 ... |
| 5 | 72 | 144 | 224 | 328 | 424 | 504 | 600 | 680 | 776 ... |
| 6 | 328 | 176 | 256 | 392 | 504 | 600 | 712 | 808 | 936 ... |
| 7 | 104 | 224 | 328 | 472 | 584 | 712 | 840 | 968 | 1096 ... |
| 8 | 120 | 256 | 392 | 536 | 680 | 808 | 968 | 1096 | 1256 ... |
| 9 | 136 | 296 | 456 | 616 | 776 | 936 | 1096 | 1256 | 1416 ... |
| 10 | 144 | 328 | 504 | 680 | 872 | 1032 | 1224 | 1384 | 1544 ... |
| 11 | 176 | 376 | 584 | 776 | 1000 | 1192 | 1384 | 1608 | 1800 ... |
| 12 | 208 | 440 | 680 | 904 | 1128 | 1352 | 1608 | 1800 | 2024 ... |
| 13 | 224 | 488 | 744 | 1000 | 1256 | 1544 | 1800 | 2024 | 2280 ... |
| 14 | 256 | 552 | 840 | 1128 | 1416 | 1736 | 1992 | 2280 | 2600 ... |
| 15 | 280 | 600 | 904 | 1224 | 1544 | 1800 | 2152 | 2472 | 2728 ... |
| 16 | 328 | 632 | 968 | 1288 | 1608 | 1928 | 2280 | 2600 | 2984 ... |
| 17 | 336 | 696 | 1064 | 1416 | 1800 | 2152 | 2536 | 2856 | 3240 ... |
| 18 | 376 | 776 | 1160 | 1544 | 1992 | 2344 | 2792 | 3112 | 3624 ... |
| 19 | 408 | 840 | 1288 | 1736 | 2152 | 2600 | 2984 | 3496 | 3880 ... |
| 20 | 440 | 904 | 1384 | 1864 | 2344 | 2792 | 3240 | 3752 | 4136 ... |
| 21 | 488 | 1000 | 1480 | 1992 | 2472 | 2984 | 3496 | 4008 | 4584 ... |
| 22 | 520 | 1064 | 1608 | 2152 | 2664 | 3240 | 3752 | 4264 | 4776 ... |
| 23 | 552 | 1128 | 1736 | 2280 | 2856 | 3496 | 4008 | 4584 | 5160 ... |
| 24 | 584 | 1192 | 1800 | 2408 | 2984 | 3624 | 4264 | 4968 | 5544 ... |
| 25 | 616 | 1256 | 1864 | 2536 | 3112 | 3752 | 4392 | 5160 | 5736 ... |
| 26 | 712 | 1480 | 2216 | 2984 | 3752 | 4392 | 5160 | 5992 | 6712 ... |

Problems with the Existent LTE Approach

Problem 1

The LTE TBS table was originally designed with specific assumptions on the number of resource elements (REs) available within each allocated PRB as well as the number of OFDM symbols for data transmissions. When different transmission modes with different amount of reference symbol overheads were introduced later in LTE, it became difficult to define another TBS table to optimize for the new transmission modes. A few new rows were introduced in the LTE TBS table to optimize for a few limited cases. It can be seen that the explicit TBS table approach hinders continual evolution and improvement of the LTE system.

Problem 2

The existing approach of determining the data block size does not provide high performance operation with different slot sizes or structures. This is a problem in LTE system since a subframe in LTE may be of various sizes. A regular subframe may have different sizes of control region and thus leaves different sizes for the data region. TDD LTE supports special subframes of different sizes in the Downlink part of the Special Subframe (DwPTS). Various different sizes of subframe are summarized in Table 3.

However, the LTE MCS and TBS tables are designed based on the assumption that 11 OFDM symbols are available for the data transmission. That is, when the actual number of available OFDM symbols for PDSCH (Physical Downlink Shared Channel) is different than 11, the spectral efficiency of the transmission will deviate from those shown in Table 4 of FIG. 12. First, the code rate becomes excessively high when the actual number of OFDM symbols for PDSCH is substantially less than the assumed 11 symbols. These cases are highlighted with bold entries Table 4 of FIG. 12. Currently in LTE, the UE is not expected to decode any PDSCH transmission with effective code rate higher than 0.930. Since the mobile station will not be able to decode such high code rates, transmissions based on these dark shaded MCSs will fail and retransmissions will be needed. Secondly, with the mismatch of radio resource assumption, code rates for some of the MCSs deviate out of the optimal range for the wideband wireless system. Based on extensive link performance evaluation for the downlink transmission as an example, the code rates for QPSK (Quadrature Phase Shift Keying) and 16QAM (Quadrature Amplitude Modulation) should not be higher than 0.70. Furthermore, the code rates for 16QAM and 64QAM should not be lower than 0.32 and 0.40, respectively. As illustrated in FIG. 12, some of the MCSs in Table 4 result in sub-optimal code rates (see bold entries).

Since data throughput is reduced when transmissions are based on unsuitable sub-optimal code rates, a good scheduling implementation in the base station should avoid using any of the bold entries of MCSs shown in Table 4 of FIG. 12. It can be concluded that the number of usable MCSs shrink significantly when the actual number of OFDM symbols for PDSCH deviates from the assumed 11 symbols.

TABLE 3

Available number of OFDM symbols for PDSCH ($N_{OS}$) in LTE

| Operation mode | | Number of OFDM symbols for control information | | | |
|---|---|---|---|---|---|
| | | 1 | 2 | 3 | 4 |
| FDD, TDD | Normal CP | 13 | 12 | 11 | 10 |
| | Extended CP | 11 | 10 | 9 | 8 |
| TDD DwPTS normal CP | configurations 1, 6 | 8 | 7 | 6 | 5 |
| | configurations 2, 7 | 9 | 8 | 7 | 6 |
| | configurations 3, 8 | 10 | 9 | 8 | 7 |
| | configuration 4 | 11 | 10 | 9 | 8 |
| TDD DwPTS extended CP | configurations 1, 5 | 7 | 6 | 5 | 4 |
| | configurations 2, 6 | 8 | 7 | 6 | 5 |
| | configuration 3 | 9 | 8 | 7 | 6 |

Problem 3

As mentioned in the above section on Slot Structure, the slot structure for NR tends to be more flexible with much larger range of the amount of allocated resource for the UE to receive or transmit. The base of designing a TBS table (as stated earlier on the specific assumption on the number of resource elements (REs) available within each allocated PRB as well as the number of OFDM symbols for data transmissions) diminishes significantly.

SUMMARY

Some embodiments of the present disclosure provide methods, nodes and computer programs to determine a transmission data block size (TDBS) that may address some or all of the above noted problems, and/or may allow an easier evolution or changes of a radio access system and/or may allow improved performance of a radio access network. According to some embodiments of the present disclosure, the transmission data block size can be determined by an Modulation Coding Scheme (MCS) index and an effective number of Resource Elements (REs) per allocated Physical Resource Block (PRB).

According to one aspect, some embodiments include a method performed by a user equipment for determining a transmission data block size. The method generally comprises obtaining parameters for a data transmission, the parameters including at least a number of layers, a number of allocated resource blocks, a modulation order and a code rate; determining an effective number of resource elements; determining a transmission data block size (TDBS) based on the obtained parameters and the determined effective number of resource elements; and performing one of transmitting and receiving data based on the determined transmission data block size.

According to another aspect, some embodiments include a user equipment configured, or operable, to perform one or more functionalities (e.g. actions, operations, steps, etc.) as described herein.

In some embodiments, the user equipment may comprise a processing circuitry configured to: obtain parameters for a data transmission, the parameters including at least a number of layers, a number of allocated resource blocks, a modulation order and a code rate; determine an effective number of resource elements; determine a transmission data block size (TDBS) based on the obtained parameters and the determined effective number of resource elements; and perform one of transmit and receive data based on the determined transmission data block size.

In some embodiments, the user equipment (UE) may comprise one or more functional modules configured to perform one or more functionalities of the UE as described herein.

According to another aspect, some embodiments include a non-transitory computer-readable medium storing a computer program product comprising instructions which, upon being executed by a processing circuitry (e.g., at least one processor) of the UE, configure the processing circuitry to perform one or more UE functionalities as described herein.

According to another aspect, there is provided a method for transmitting or receiving data. The method comprises: transmitting parameters for a data transmission, the parameters including at least a number of layers, a number of allocated resource blocks, a modulation order and a code rate; transmitting an effective number of resource elements; and performing one of receiving and transmitting data based on a transmission data block size, which is determined based on the transmitted parameters and effective number of resource elements.

Yet, according to another aspect, there is provided a network node for transmitting or receiving data. The network node comprises a processing circuitry configured to: transmit parameters for a data transmission, the parameters including a number of layers, a number of allocated resource blocks, a modulation order and a code rate; transmit an effective number of resource elements; and perform one of receive and transmit data based on a transmission data block size, which is determined based on the transmitted parameters and effective number of resource elements.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIGS. 1a, 1b and 1c illustrate examples of a slot, slot variations and a mini-slot according to an NR system.

FIG. 12 shows a table, illustrating a code rate with different number of OFDM symbols for data transmission in LTE.

DETAILED DESCRIPTION

Figure 2:
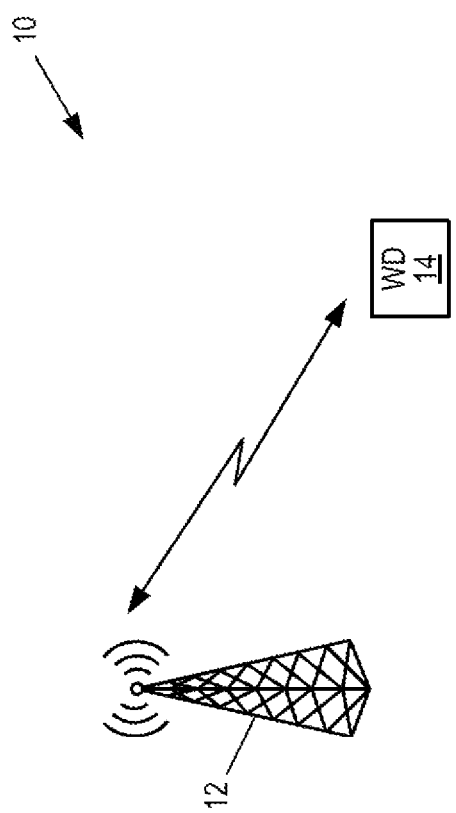
FIG. 2 illustrates one example of a wireless communications system in which embodiments of the present disclosure may be implemented.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

In the present application, the terms UE (User Equipment), terminal, mobile station, handset, wireless device etc. are used interchangeably to denote a device that communicates with a wireless infrastructure. The term should not be construed as to mean any specific type of device, it applies to them all, and the solutions described here are applicable to all devices that use methods according embodiments of the present disclosure. Similarly, a base-station is intended to denote the node in the wireless infrastructure that communicates with the UE. Different names may be applicable, and the functionality of the base-station may be distributed in various ways. For example, there could be a radio head implementing (or carrying out) parts of the radio protocols and a centralized unit that implements (or carries out) other parts of the radio protocols. We will not distinguish such implementations here, instead the term base-station will refer to all alternative architectures that can implement (or is operable to carry out) some embodiments according to the present disclosure.

Furthermore, as used herein, a "radio node" is either a radio access node or a wireless device.

As used herein, a "radio access node" is any node in a radio access network of a cellular communications network that operates to wirelessly transmit and/or receive signals. Some examples of a radio access node include, but are not limited to, a base station (e.g., an enhanced or evolved Node B (eNB) in a Third Generation Partnership Project (3GPP) Long Term Evolution (LTE) network or a gNB in a 3GPP New Radio (NR) network), a high-power or macro base station, a low-power base station (e.g., a micro base station, a pico base station, a home eNB, or the like), and a relay node.

As used herein, a "core network node" is any type of node in a core network. Some examples of a core network node include, e.g., a Mobility Management Entity (MME), a Packet Data Network (PDN) Gateway (P-GW), a Service Capability Exposure Function (SCEF), or the like.

As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

As used herein, a "network node" is any node that is either part of the radio access network or the core network of a cellular communications network/system.

Note that the description given herein focuses on a 3GPP cellular communications system and, as such, 3GPP LTE terminology or terminology similar to 3GPP LTE terminology is oftentimes used. However, the concepts disclosed herein are not limited to LTE or a 3GPP system.

Note that, in the description herein, reference may be made to the term "cell;" however, particularly with respect to the Fifth Generation (5G), or NR's concepts, beams may be used instead of cells and, as such, it is important to note that the concepts described herein are equally applicable to both cells and beams. Throughout the disclosure, 'downlink (DL)/uplink (UL) transmission' refers to a communication link with a transmitter from one radio node and a receiver at another radio node. In legacy cellular systems, the functions of network node and UE node are not symmetric, therefore there is DL or UL. For the sidelink communications, two nodes (often both are UE devices) are symmetric by function. 'Sidelink transmission (or communication)' also refers to a communication link with a transmitter from one node and a receiver at another node.

Embodiments of the present disclosure for determining a transmission data block size potentially allow an easier evolution or changes of the system and/or improved performance.

FIG. 2 illustrates one example of a wireless communications system 10 (e.g., a cellular network) in which embodiments of the present disclosure may be implemented. As illustrated, the wireless communications system 10 includes a radio access node 12 that provides wireless, or radio, access to a wireless device 14. In some embodiments, the wireless communications system 10 is a 3GPP LTE network in which case the radio access node 12 may be an eNB (and thus referred to herein as an eNB 12). In some other embodiments, the wireless communications system 10 is a 3GPP NR network in which case the radio access node 12 may be a gNB (and thus referred to therein as a gNB 12). Notably, for the following description, the radio access node 12 is an eNB 12 and the wireless device 14 is a UE (and thus referred to herein as a UE 14); however, the present disclosure is not limited thereto.

In the present disclosure, the generic term transmission data block size (TDBS) is used. Such transmission data block size (TDBS) may correspond to the transport block size (TBS) as used in current LTE specifications. Such transmission data block size (TDBS) may also correspond to different protocol definitions and different aggregations of radio resource units. Non-limiting examples of radio resource units include OFDM symbols, spatial layers, bandwidth parts and carriers. The term PRB (Physical Resource Block) is also used as a generic term to refer to resource allocation unit in a system operating based on various protocols, not only based on current LTE specifications. It will be clear to one skilled in the art to apply the teaching to these different definitions or aggregation variations.

Figure 3:
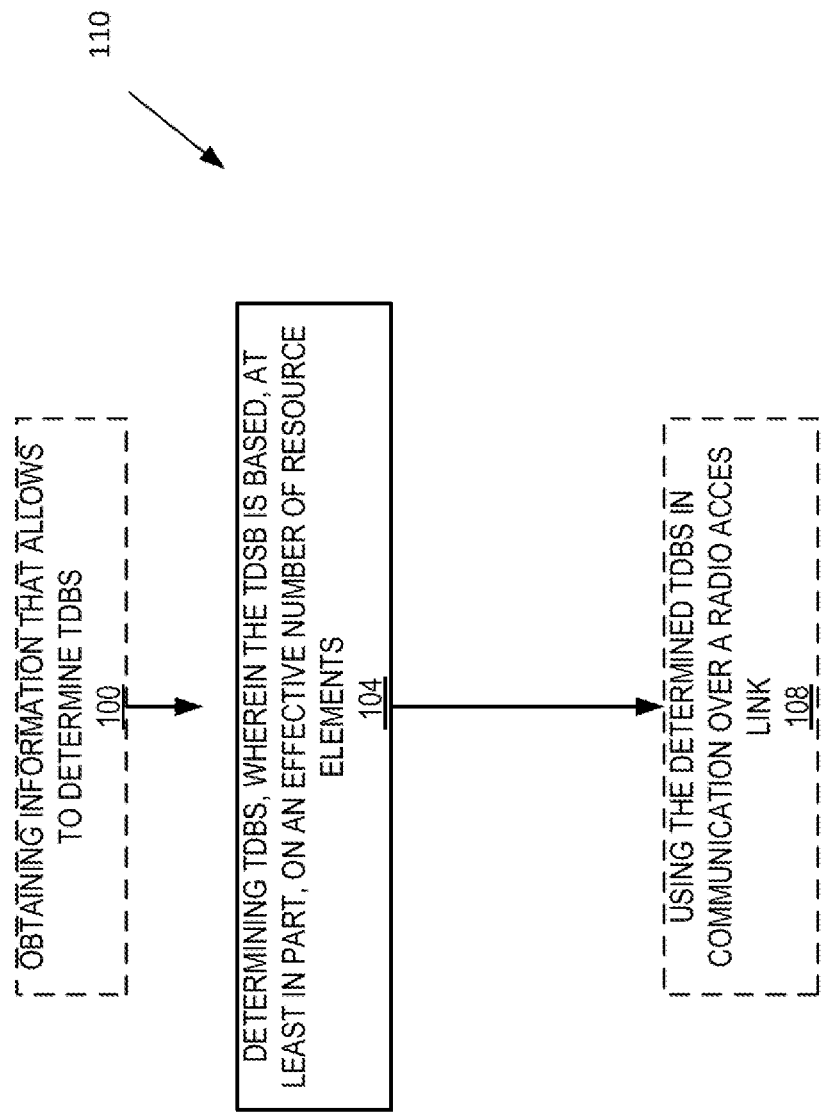
FIG. 3 is a flow chart that illustrates the operation of a radio node according to some embodiments of the present disclosure.

A flow chart illustrating a method 110 for a radio node according to embodiments of one aspect of the disclosure is illustrated in FIG. 3. The method 110 is for a radio node, for example wireless device 14. The method comprises the following steps:

Step 100 (optional): OBTAINING INFORMATION THAT ALLOWS TO DETERMINE TDBS;

Step 104: DETERMINING TDBS, WHEREIN THE TDSB IS BASED, AT LEAST IN PART, ON AN EFFECTIVE NUMBER OF RESOURCE ELEMENTS, $N_{RE}$;

Step 108 (optional): USING THE DETERMINED TDBS IN COMMUNICATION OVER A RADIO ACCESS LINK.

Figure 4:
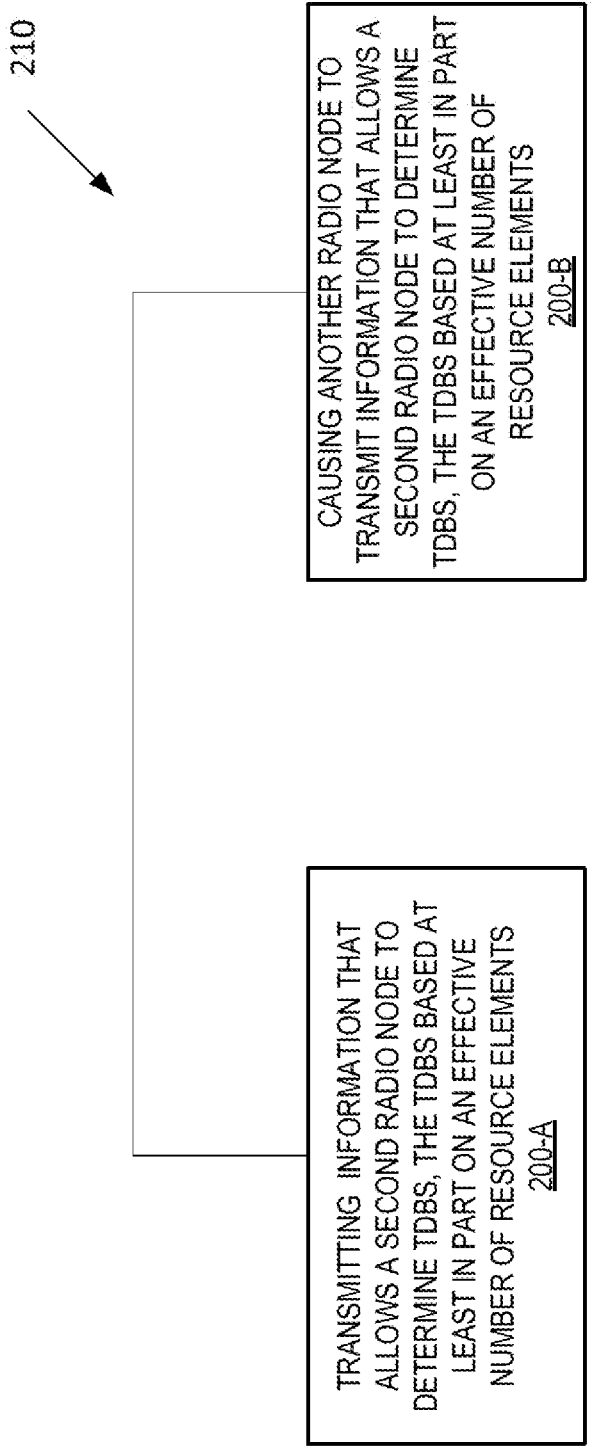
FIG. 4 is a flow chart that illustrates the operation of a radio node according to other embodiments of the present disclosure.

A flow chart illustrating a method 210 for a radio node according to embodiments of another aspect of the disclosure is illustrated in FIG. 4. The method is for a radio node, for example network node 12. The method 210 comprises the following steps:

STEP 200-A: TRANSMITTING INFORMATION THAT ALLOWS A SECOND RADIO NODE TO DETERMINE TDBS, THE TDBS BASED AT LEAST IN PART ON AN EFFECTIVE NUMBER OF RESOURCE ELEMENTS; AND/OR

STEP 200-B: CAUSING ANOTHER RADIO NODE TO TRANSMIT INFORMATION THAT ALLOWS A SECOND RADIO NODE TO DETERMINE TDBS, THE TDBS BASED AT LEAST IN PART ON AN EFFECTIVE NUMBER OF RESOURCE ELEMENTS

Steps 200-A and 200-B, may both be performed, or only one may be performed. If both are performed, the information transmitted in each step may be complementary.

Further embodiments, that may be used on their own or in combination with the methods in FIGS. 3 and 4, are described next.

Determination Using the Effective Number of Resource Elements Per PRB (Method A)

In one aspect of the present disclosure, in a method (A) for a radio node such as a UE, the transmission data block size is determined using the effective number of resource elements per PRB. Throughout the present disclosure, PRB is used as the frequency domain unit of resource allocation and has no limitation of the resource allocated in the time domain.

According to one embodiment according to this aspect, the radio node (e.g. a UE) determines the transmission data block size based on a modulation order $Q_m$, a code rate r, the number of spatial layers v, the allocated number of PRBs $N_{PRB}$ and an effective number of resource elements per PRB $N_{RE}$.

In another nonlimiting embodiment, the transmission data block size is given by:

$$N_{PRB} \cdot N_{RE} \cdot v \cdot Q_m \cdot r \qquad [1]$$

In another nonlimiting embodiment, the transmission data block size is adjusted to be aligned with a specific size unit C:

$$C \times \left\lceil \frac{N_{PRB} \cdot N_{RE} \cdot v \cdot Q_m \cdot r}{C} \right\rceil \qquad [2]$$

where $\lceil x \rceil$ is the ceiling function giving the smallest integer no smaller than x. One nonlimiting example is C=8 such that the transmission data block size is adjusted to be aligned with byte size:

$$8 \times \left\lceil \frac{N_{PRB} \cdot N_{RE} \cdot v \cdot Q_m \cdot r}{8} \right\rceil \qquad [3]$$

Different settings of C allow the transmission data block size to be adjusted to satisfy different constraints. For example, in LTE, a transport block may be sub-divided into multiple code blocks with constraint that all code blocks are of equal size. The same may be applicable to other protocols.

In one embodiment, the parameters that are used to derive the transmission data block size may be known to both the transmitter and the receiver of a radio access link. In one embodiment, the parameters (or parameter values, or information related to the parameters) may be signaled between the transmitter and receiver either semi-statically, i.e. via higher layer signaling, or dynamically such as via physical control information (e.g. downlink control information (DCI)). The signaling of parameter values can be implicit (e.g. via other parameters) or explicit (e.g. as standalone parameters). While other variations are possible, one embodiment is described below:

Together the modulation order $Q_m$ and code rate r are signaled dynamically via DCI and are provided by one DCI field called MCS (modulation and coding scheme). This is described with further details below:

The number of spatial layers v is provided by a DCI field, e.g. with the related MIMO scheme configured semi-statically via higher layer signaling.

The number of allocated PRBs $N_{PRB}$ is signaled dynamically by a DCI field, or implied by PRB allocation which is also signaled dynamically by a DCI field.

The effective number of resource elements per PRB $N_{RE}$ can be provided in multiple ways as described below:

i. Implicitly via other configuration parameters. For example, the effective number of resource elements per PRB can be determined by various configurations, including: the slot configuration (including mini-slot), FDD vs TDD, control region configuration, the reference symbol configuration etc. In this case, no signaling of $N_{RE}$ is necessary. In some embodiments, the implicitly derived value can also be considered the default value, which can be overwritten by an explicitly signaled value.

ii. Explicitly via higher layer signaling. This is a semi-static configuration of $N_{RE}$. For example, the gNB can select a value of $N_{RE}$ from a set of predefined values of $N_{RE}$, and then send the selected value of $N_{RE}$ to the radio node (e.g. a UE) during RRC configuration or reconfiguration. The selected value of $N_{RE}$ is assumed by both the transmitter and receiver for all subsequent transmissions until a new value is signaled via higher layer signaling.

iii. Explicitly via DCI. This is a dynamic configuration of $N_{RE}$. For example, the gNB can select a value of $N_{RE}$ from a set of predefined values of $N_{RE}$, and then send the selected value to the UE via a DCI field. In some embodiments, the DCI signaled value is only used for the data transmission related to the DCI, not for all the subsequent transmissions. For DCI providing information for a single data transmission, the value of $N_{RE}$ may be used for the single data transmission only. For DCI providing information of semi-persistent data transmission, the value of $N_{RE}$ may be used for the multiple data transmission in the semi-persistent configuration.

iv. A combination of the above methods. For example, explicitly via a combination of higher layer signaling and DCI signaling. This uses a combination of semi-static configuration and dynamic configuration of $N_{RE}$. A higher layer signaling could be a base value, while an offset from the base value could be signaled by the DCI.

In general, the aspects and their embodiments of the present disclosure are applicable for any radio access link between a transmitter and a receiver of two different radio nodes, respectively, including downlink data transmission, uplink data transmission and side-link communication. For the parameter $N_{RE}$, according to some embodiments, there may be one for the downlink communication and another one for the uplink communication. For example, one parameter $N_{RE}^{DL,PRB}$ is defined for the downlink data transmission, while another parameter $N_{RE}^{UL,PRB}$ is defined for the uplink data transmission. Typically, $N_{RE}^{DL,PRB}$ and $N_{RE}^{UL,PRB}$ take independent and different values.

Furthermore, yet another parameter can be defined for the sidelink communication. In this case, two peer devices can share a single sidelink parameter $N_{RE}^{SL,PRB}$.

For HARQ transmission and retransmission of a same data block (e.g., transport block, TB), the block size may have to be kept the same, even when:
 DCI of a transmission or retransmission is not received correctly, including the initial transmission;
 HARQ-ACK response to a transmission or retransmission is not received correctly, including the initial transmission;
 Time and/or frequency resource configuration changes between the (re-)transmissions of a same data block.

Hence, the base station may have to make sure that when considering the aggregated effect of all the parameters, the transmission data block size (TDBS) obtained by embodiments of the above method stays the same for a given transport block, even if individual parameter value may change.

Signaling of MCS

It's one feature of some embodiments of the present disclosure that a radio node (e.g. a UE) use an MCS index $I_{MCS}$ to determine the modulation order $Q_m$ and code rate r. In one exemplary embodiment, the radio node (e.g. a UE) reads the modulation order $Q_m$ and code rate r from an MCS table using the MCS index $I_{MCS}$. A nonlimiting example of the MCS table is shown in Table 5.

It is noted that multiple MCS tables can be defined in the NR system. For example:
 Downlink and uplink may have different MCS tables.
 OFDM and DFT-S-OFDM based transmissions may use different MCS tables;

Different radio node (e.g. UE) categories may use different MCS tables. For example, low-cost UEs (e.g., MTC UE, NB-IoT UEs) may use different MCS tables.

TABLE 1

Nonlimiting exemplary MCS table according to some embodiments of the disclosure

| MCS index $I_{MCS}$ | Modulation order $Q_m$ | Code rate r × 1024 |
|---|---|---|
| 0 | 2 | 120 |
| 1 | 2 | 157 |
| 2 | 2 | 193 |
| 3 | 2 | 251 |
| 4 | 2 | 308 |
| 5 | 2 | 379 |
| 6 | 2 | 449 |
| 7 | 2 | 526 |
| 8 | 2 | 602 |
| 9 | 2 | 679 |
| 10 | 4 | 340 |
| 11 | 4 | 378 |
| 12 | 4 | 434 |
| 13 | 4 | 490 |
| 14 | 4 | 553 |
| 15 | 4 | 616 |
| 16 | 4 | 658 |
| 17 | 6 | 438 |
| 18 | 6 | 466 |
| 19 | 6 | 517 |
| 20 | 6 | 567 |
| 21 | 6 | 616 |
| 22 | 6 | 666 |
| 23 | 6 | 719 |
| 24 | 6 | 772 |
| 25 | 6 | 822 |
| 26 | 6 | 873 |
| 27 | 6 | 910 |
| 28 | 6 | 948 |

Signaling of the Effective Number of Resource Elements Per PRB $N_{RE}$

It's a further feature of some embodiments according to the present disclosure that the effective number of resource elements per PRB $N_{RE}$ is semi-statically configured by the network node (such as 12) via higher layer signaling system. The effective number of resource elements per PRB $N_{RE}$ can be included in the system information block transmission or broadcast. The effective number of resource elements per PRB $N_{RE}$ can be configured by higher protocols such as the radio resource control (RRC) layer protocol.

It's yet another feature of some embodiments according to the present disclosure that the network node 12, via higher layer signaling, semi-statically configures a set of values for the effective number of resource elements per PRB $N_{RE}$. An index may be included in the downlink control information (DCI) to indicate the $N_{RE}$ value that the radio node (e.g. UE) should apply to the corresponding transmission or reception. In one nonlimiting example, two $N_{RE}$ values are semi-statically configured and a 1-bit index is included in the DCI to select the applicable $N_{RE}$ value. In another nonlimiting example, four $N_{RE}$ values are semi-statically configured and a 2-bit index is included in the DCI to select the applicable $N_{RE}$ value.

In a further embodiment, the effective one or multiple numbers of resource elements per PRB $N_{RE}$ are provided in the DCI.

Examples for calculating the effective number of resource elements per PRB $N_{RE}$ are now provided.

One example of calculating $N_{RE}$ for DL, $N_{RE}^{DL,PRB}$, is:

$$N_{RE}^{DL,PRB}=12 \times n_{OFDM}-N_{RE}^{PTRS} \quad [4]$$

Here $n_{OFDM}$ is the number of OFDM symbols used for data transmission. Typical value of $n_{OFDM}$ for a slot is $n_{OFDM}=5$ or $n_{OFDM}=12$, where 2 OFDM symbols are excluded for DL control and DMRS. Lower values of $n_{OFDM}$ is expected when a mini-slot is used for data transmission. $N_{RE}^{PTRS}$ is the average number of resource elements per PRB used for Phase Tracking Reference Signal (PTRS). In the above, 12 refers to the number of subcarriers in a PRB, i.e. there are 12 subcarriers in a PRB in this example.

In one embodiment, if the slot configuration does not change between (re-)transmissions associated with the given transport block, the parameter $N_{RE}^{DL,PRB}$ may be calculated by:

$$N_{RE}^{DL,PRB}=12\times(N_{symb}^{(nsc)}(n_{DataSlots}-1)+l_{DataStop}-l_{DataStart}+1)-N_{RE}^{PTRS} \quad [5]$$

where $n_{DataSlots}, l_{DataStart}, l_{DataStop}$ are defined as:
the length in number of slots of the resource allocation, $n_{DataSlots}$,
the first OFDM symbol in the first slot of the corresponding PDSCH, $l_{DataStart}$,
the last OFDM symbol in the last slot of the corresponding PDSCH, $l_{DataStop}$.
and $N_{RE}^{PTRS}$ is the average number of REs per PRB that is used for PTRS.

Determination Using the Effective Number of Resource Elements Per Time-Domain Symbol per PRB (Method B)

In another embodiment, in a method (B) for a radio node (e.g. either a UE or a base station), the transmission data block size is determined using the effective number of resource elements per time-domain symbol per PRB. The time-domain symbol can be either OFDM symbol or DFT-SC-OFDM symbol, for an uplink transmission for example.

The UE determines the transmission data block size based on a modulation order $Q_m$, a code rate r, the number of spatial layers v, the allocated number of PRBs $N_{PRB}$, the number of allocated time-domain symbols (OFDM symbols or DFT-SOFDM symbols) $N_{symb}$, and an effective number of resource elements per OFDM symbol (or DFT-SC-OFDM symbol) per PRB $N_{RE}^{symb}$.

In one nonlimiting embodiment, the transmission data block size is given by:

$$N_{PRB} \cdot N_{symb} \cdot N_{RE}^{symb} \cdot v \cdot Q_m \cdot r$$

In another nonlimiting embodiment, the transmission data block size is adjusted to be aligned with a specific size unit C:

$$C \times \left\lceil \frac{N_{PRB} \cdot N_{symb} \cdot N_{RE}^{symb} \cdot v \cdot Q_m \cdot r}{C} \right\rceil \quad [7]$$

where $\lceil x \rceil$ is the ceiling function giving the smallest integer no smaller than x. One nonlimiting example is C=8 such that the transmission data block size is adjusted to be aligned with byte size:

$$8 \times \left\lceil \frac{N_{PRB} \cdot N_{symb} \cdot N_{RE}^{symb} \cdot v \cdot Q_m \cdot r}{8} \right\rceil \quad [8]$$

Different settings of C allow the transmission data block size to be adjusted to satisfy different constraints. For example, currently in LTE, a transport block may be subdivided into multiple code blocks with the constraint that all code blocks are of equal size.

Similar to some embodiments of the method (A), the parameters that are used to derive the transmission data block size are known to both the transmitter and the receiver. The knowledge about the parameter values is signaled between the transmitter and receiver either semi-statically via higher layer signaling, or dynamically via downlink control information (DCI). The signaling of the parameter values can be implicit or explicit.

Similar to some embodiments of the method (A), the base station can make sure that when considering the aggregated effect of all parameters, the data block size obtained by the above method stays the same for a given transport block, even if individual parameter values may change.

An example for calculating the number of allocated time-domain symbols $N_{symb}$ is shown below.

For DL transmissions, the resource allocation in the time domain is given by:
the length in number of slots of the resource allocation, $n_{DataSlots}$,
the first OFDM symbol in the first slot of the corresponding PDSCH, $l_{DataStart}$,
the last OFDM symbol in the last slot of the corresponding PDSCH, $l_{DataStop}$.
Then, $N_{symb}$=#symbols_per_slot*#slots−#symbols_lost_at_start−#symbols_lost_at_end, i.e.:

$$N_{symb}=N_{symb}^{(nsc)}n_{DataSlots}-l_{DataStart}-(N_{symb}^{(nsc)}-l_{DataStop}-1)=N_{symb}^{(nsc)}(n_{DataSlots}-1)+l_{DataStop}-l_{DataStart}+1 \quad [9]$$

Examples of $N_{RE}^{symb}$ values are provided below.

If all REs in a time domain symbol per PRB is used for data transmission, then $N_{RE}^{symb}=12$.

If on average, d REs cannot be used for data transmission in a time domain symbol per PRB, then $N_{RE}^{symb}=12-d$.

Figure 10:
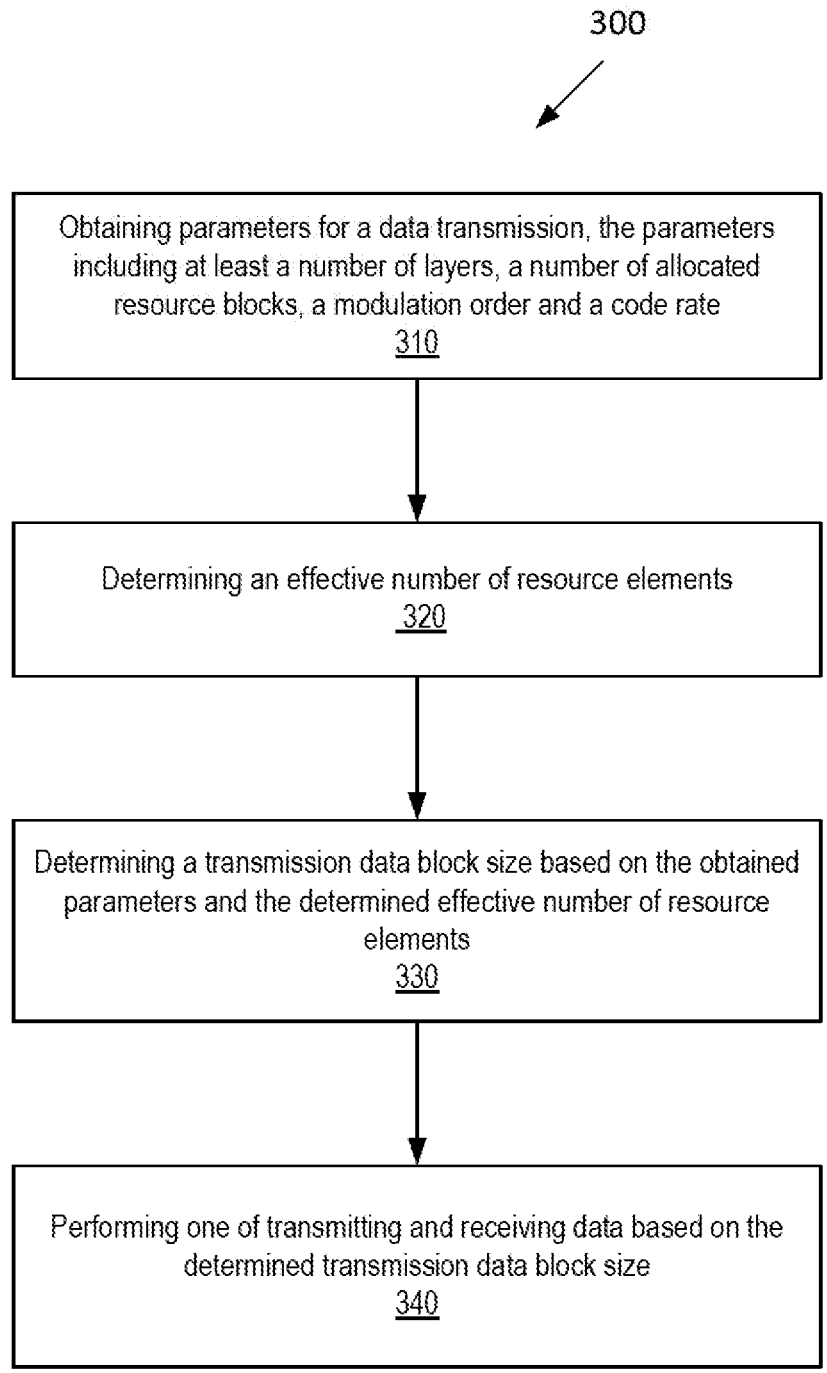
FIG. 10 illustrates a flow chart of a method in a user equipment (UE) according to some embodiments.

Now, turning to FIG. 10, a method 300 in a user equipment (UE), such 14, for determining the TDBS will be described. Method 300 is an example embodiment of method 110.

Method 300 comprises the following steps:

Step 310: Obtaining parameters for a data transmission, the parameters including at least a number of layers, a number of allocated resource blocks, a modulation order and a code rate.

Step 320: Determining an effective number of resource elements.

Step 330: Determining a transmission data block based on the obtained parameters and the determined effective number of resource elements.

Step 340: Performing one of transmitting and receiving data based on the determined transmission data block size.

For example, in step 310, obtaining the parameters may comprise receiving a signal comprising information (such as DCI) from a network node, such as the gNB 12, the information related to the number of layers, the modulation order and the code rate and the number of allocated resource blocks. For example, the DCI may comprise a first field such as the MCS field for indicating the modulation order and the code rate, a second field for indicating the number of layers, and a third field (such as a resource allocation field) for indicating the number of allocated PRBs. The MCS field may comprise a MCS index, which can be used by the UE to look up a MCS table to determine the modulation order and code rate. In some embodiments, the signal or DCI may comprise information related to the modulation order and the code rate and the number of allocated resource blocks. The number of layers can be predefined or configured. In some embodiments, the signal may be a signaling of higher layer than the physical layer. For example, the signal can be a RRC signal, which comprises the information related to the parameters.

In step 320, the effective number of resource elements $N_{RE}$ can be determined in different ways. It should be noted that the effective number of resource elements represent the number of REs which are exclusively used for carrying user data (i.e. no control data).

For example, the determination of the effective number of resource elements can be based at least on one or more of: a slot configuration, mini-slot configuration, control region configuration, reference symbol configuration, frequency division duplex and time division duplex.

In some embodiments, the gNB can select a value of $N_{RE}$ from a set of predefined values of $N_{RE}$ and then send the selected value to the UE. As such, the UE receives the $N_{RE}$ via higher layer signaling, for example, during a RRC configuration. The gNB can also send the selected value of $N_{RE}$ via DCI. In some embodiments, the UE can determine an effective number of resource elements for an uplink transmission, a downlink transmission or a sidelink transmission. An example of the effective number of resource elements for the downlink transmission ($N_{RE}^{DL,PRB}$) can be determined as follows:

$$N_{RE}^{DL,PRB} = 12 \times n_{OFDM} - N_{RE}^{PTRS}$$

where $n_{OFDM}$ is a number of OFDM symbols used for the data transmission, $N_{RE}^{PTRS}$ is an average number of resource elements per PRB used for Phase Tracking Reference Signal (PTRS), 12 refers to the number of subcarriers in a PRB.

In step 330, the UE can determine the TDBS based on the obtained parameters and the determined effective number of resource elements as follows:

$$N_{PRB} \cdot N_{RE} \cdot v \cdot Q_m \cdot r$$

where $N_{PRB}$ is the number of allocated resource blocks, $N_{RE}$ is the number of effective resource elements, v is the number of layers, $Q_m$ is the modulation order and r is the code rate.

In some embodiments, the UE may further adjust the determined TDBS to be aligned with a size unit, such as C. As such, the adjusted TDBS is able to satisfy different constraints, imposed by the size C, for example.

To do so, the UE may determine the adjusted TDBS as follows:

$$C \times \left\lceil \frac{N_{PRB} \cdot N_{RE} \cdot v \cdot Q_m \cdot r}{C} \right\rceil$$

It should be noted that the effective number of resource elements can comprise an effective number of resource elements per PRB or an effective number of resource elements per time domain symbol per PRB. For example, the time-domain symbol can be an OFDM symbol or a DFT-SC-OFDM symbol. In this case, the TDBS can be given by equation [6] and the adjusted TDBS to align with the size C can be given by equation [7].

In step 340, once the TDB S is determined, the UE can either transmit data or receive data, based on the determined TDBS.

Figure 11:
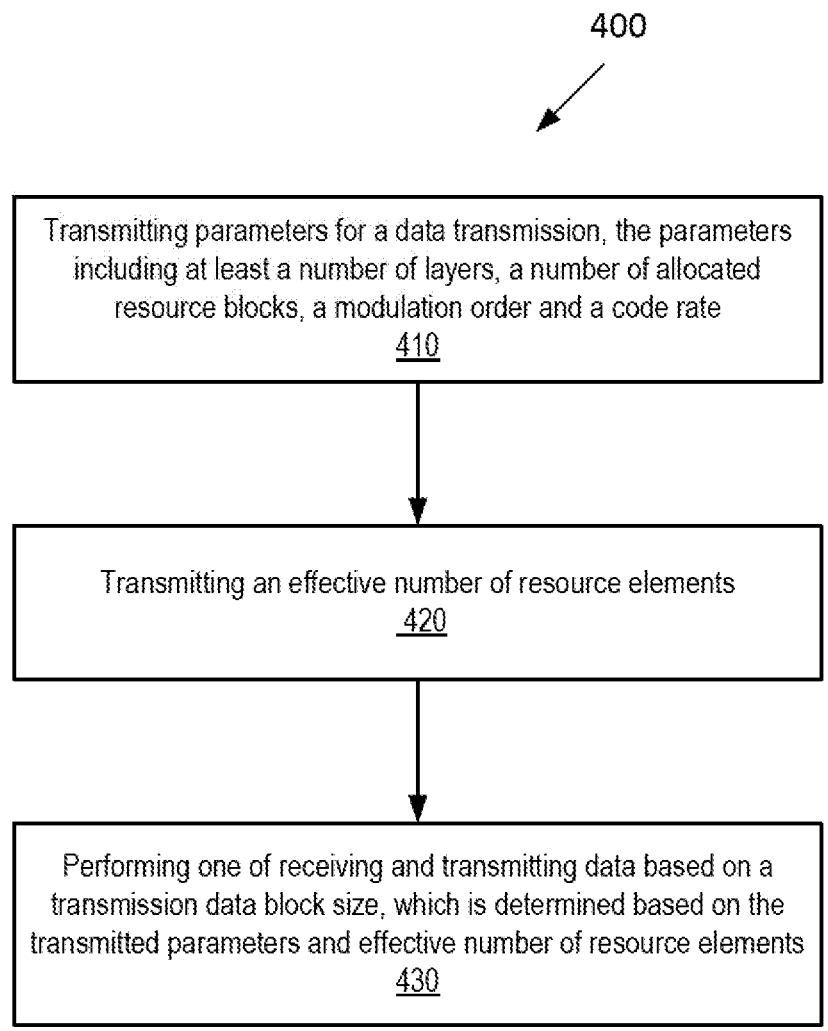
FIG. 11 illustrates a flow chart of a method in a network node in accordance with some embodiments.

FIG. 11 illustrates a flow chart of a method 400 for receiving or transmitting data. Method 400 is an example of method 210 of FIG. 4. Method 400 can be implemented in the network 12, for example.

Method 400 comprises the following steps.

Step 410: transmitting parameters for a data transmission, the parameters including at least a number of layers, a number of allocated resource blocks, a modulation and a code rate.

Step 420: transmitting an effective number of resource elements.

step 430: performing one of receiving and transmitting data based on a transmission data block size, which is determined based on the transmitted parameters and effective number of resource elements.

For example, in step 410, the network node can transmit the parameters for the data transmission in a signal comprising information such as DCI. The DCI may comprise different fields for indicating the parameters. For example, the DCI may have a MCS field for indicating the modulation order and code rate, a resource allocation field for indicating the number of allocated PRBs and a field for indicating the number of layers. In some embodiments, the signal or DCI may comprise information related to the modulation order and code rate and the number of allocated PRBs. The number of layers can be predefined or configured. In some embodiments, the network node can transmit the parameters using higher layer signaling, such as a RRC signal.

In step 420, the network node can first determine the effective number of resource elements ($N_{RE}$) before sending it. For example, the network node can determine $N_{RE}$ based on at least on one or more of: a slot configuration, mini-slot configuration, control region configuration, reference symbol configuration, frequency division duplex and time division duplex. The network node can also select a $N_{RE}$ value among a set of predefined effective number of resource elements and then send the selected $N_{RE}$ to the UE.

Furthermore, the effective number of resource elements can be transmitted to the UE in a signal comprising DCI or through higher layer signaling such as a RRC signal.

In step 430, the network node can either transmit data or receive data, based on a determined TDBS. The TDBS can be determined by the network node itself or it can be received from the UE or even from another node.

Figure 5:
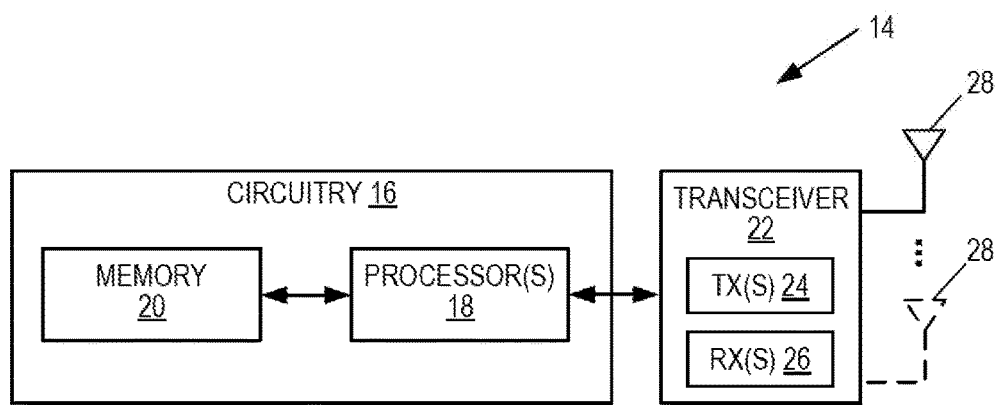
FIGS. 5 and 6 are block diagrams that illustrate a wireless device according to some embodiments of the present disclosure.

FIG. 5 is a schematic block diagram of the wireless device 14 according to some embodiments of the present disclosure. As illustrated, the wireless device 14 includes circuitry 16 comprising one or more processors 18 (e.g., Central Processing Units (CPUs), Application Specific Integrated Circuits (ASICs), Field Programmable Gate Arrays (FPGAs), and/or the like) and memory 20. The wireless device 14 also includes one or more transceivers 22 each including one or more transmitter 24 and one or more receivers 26 coupled to one or more antennas 28. In some embodiments, the functionality of the wireless device 14 described above may be fully or partially implemented in software that is, e.g., stored in the memory 20 and executed by the processor(s) 18. For example, the processor 18 is configured to perform method 110 of FIG. 3 and method 300 of FIG. 10.

In some embodiments, a computer program including instructions which, when executed by the at least one processor 18, causes the at least one processor 18 to carry out the functionality of the wireless device 14 according to any of the embodiments described herein is provided (e.g. methods 110 and 300). In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 6:
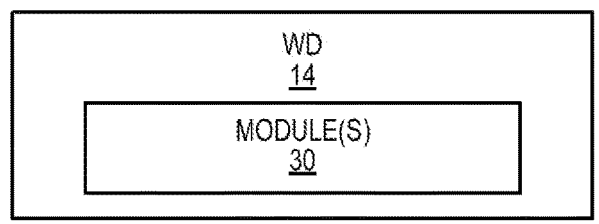

FIG. 6 is a schematic block diagram of the wireless device 14 according to some other embodiments of the present disclosure. The wireless device 14 includes one or more modules 30, each of which is implemented in software. The module(s) 30 provide the functionality of the wireless device 14 described herein. The module(s) 30 may comprise, for example, an obtaining module operable to perform steps 100 of FIG. 3 and 310 of FIG. 10, a determination module operable to perform steps 104 of FIG. 3 and 320 and 330 of FIG. 10, and a use module operable to perform step 108 of FIG. 3 or a transmitting/receiving module operable to perform step 340 of FIG. 10.

Figure 7:
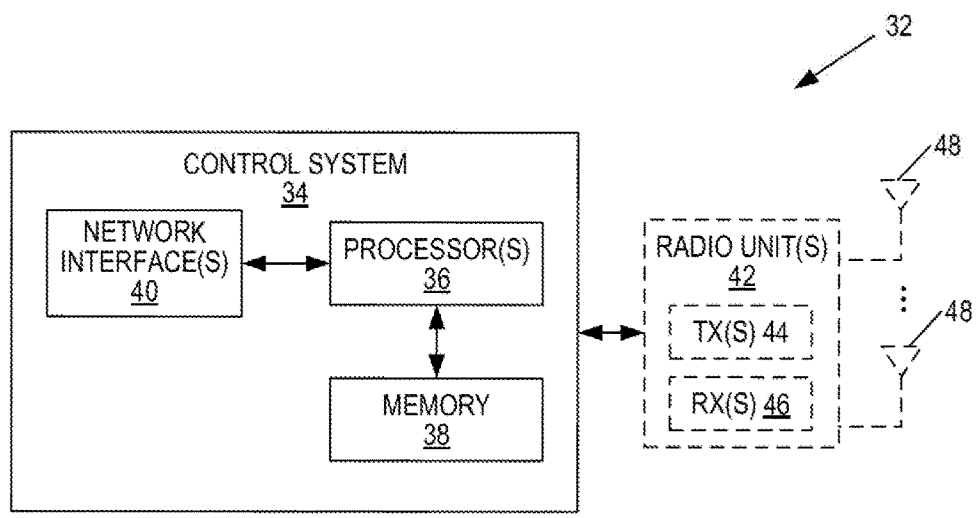
FIGS. 7 through 9 are block diagrams that illustrate a radio access node according to some embodiments of the present disclosure.

FIG. 7 is a schematic block diagram of a network node 32 (e.g., a radio access node 12) according to some embodiments of the present disclosure. As illustrated, the network node 32 includes a control system 34 that includes circuitry comprising one or more processors 36 (e.g., CPUs, ASICs, FPGAs, and/or the like) and memory 38. The control system 34 also includes a network interface 40. In embodiments in which the network node 32 is a radio access node 12, the network node 32 also includes one or more radio units 42 that each include one or more transmitters 44 and one or more receivers 46 coupled to one or more antennas 48. In some embodiments, the functionality of the network node 32 described above may be fully or partially implemented in software that is, e.g., stored in the memory 38 and executed by the processor(s) 36. For example, the processor 36 can be configured to perform the methods 210 of FIG. 4 and 400 of FIG. 11.

Figure 8:
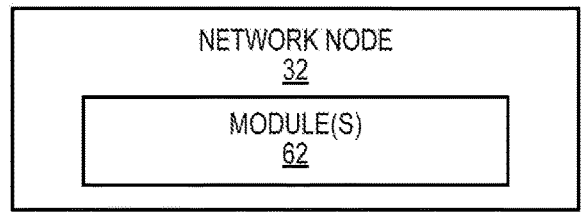

FIG. 8 is a schematic block diagram of the network node 32 (e.g., the radio access node 12) according to some other embodiments of the present disclosure. The network node 32 includes one or more modules 62, each of which is implemented in software. The module(s) 62 provide the functionality of the network node 32 described herein. The module(s) 62 may comprise a transmitting module operable to transmit or cause another node to transmit to a wireless device 14 information that allows determining a TDBS, as per steps 200-A and 200-B of FIG. 4. The transmitting module may also be operable to perform the steps 410 and 420 of FIG. 11. The modules 62 may further comprise a receiving/transmitting module operable to perform step 430 of FIG. 11.

Figure 9:
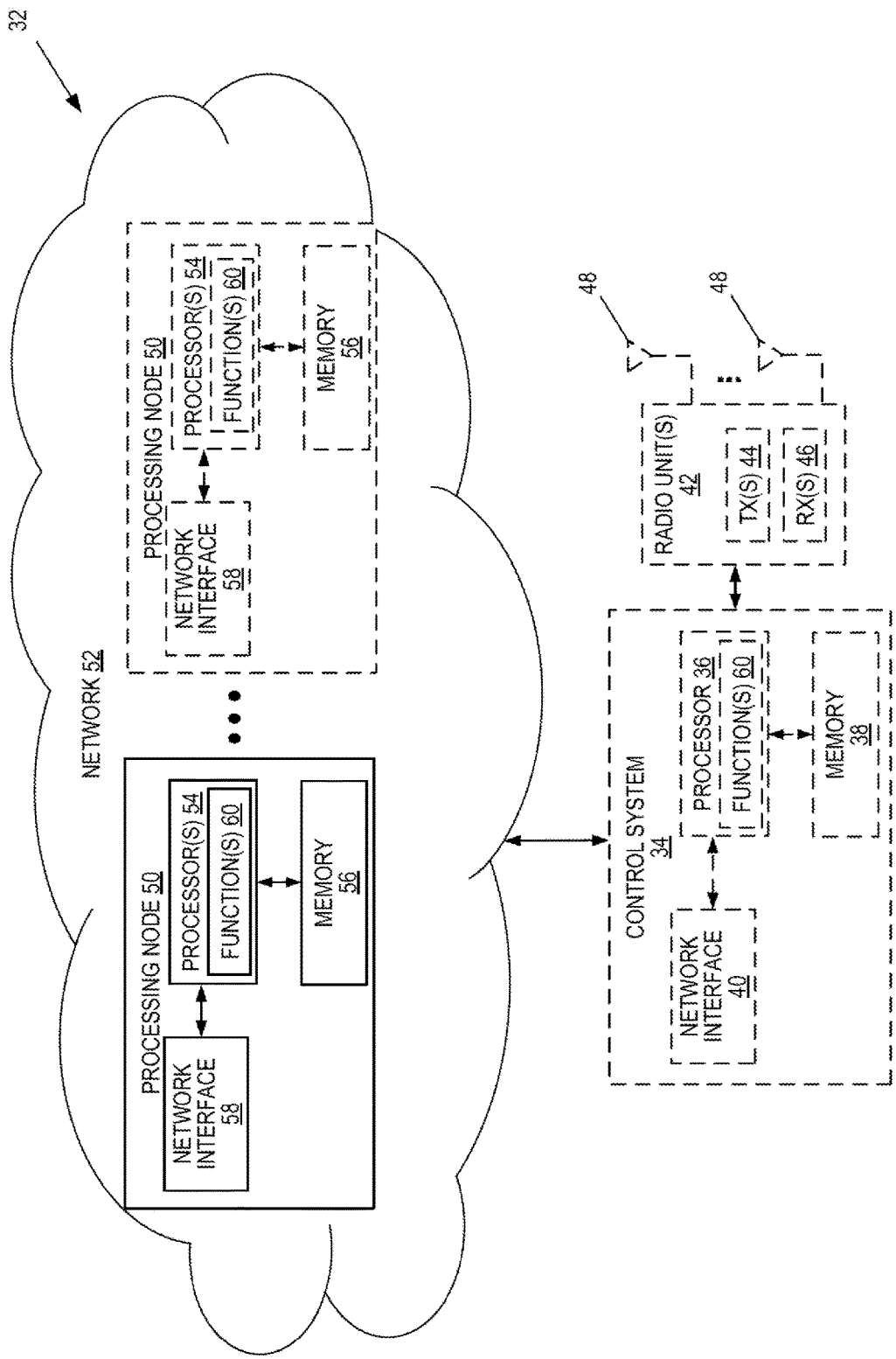

FIG. 9 is a schematic block diagram that illustrates a virtualized embodiment of the network node 32 (e.g., the radio access node 12) according to some embodiments of the present disclosure. As used herein, a "virtualized" network node 32 is a network node 32 in which at least a portion of the functionality of the network node 32 is implemented as a virtual component (e.g., via a virtual machine(s) executing on a physical processing node(s) in a network(s)). As illustrated, the network node 32 optionally includes the control system 34, as described with respect to FIG. 10. In addition, if the network node 32 is the radio access node 12, the network node 32 also includes the one or more radio units 42, as described with respect to FIG. 10. The control system 34 (if present) is connected to one or more processing nodes 50 coupled to or included as part of a network(s) 52 via the network interface 40. Alternatively, if the control system 34 is not present, the one or more radio units 42 (if present) are connected to the one or more processing nodes 50 via a network interface(s). Alternatively, all of the functionality of the network node 32 described herein may be implemented in the processing nodes 50 (i.e., the network node 32 does not include the control system 34 or the radio unit(s) 42). Each processing node 50 includes one or more processors 54 (e.g., CPUs, ASICs, FPGAs, and/or the like), memory 56, and a network interface 58.

In this example, functions 60 of the network node 32 described herein are implemented at the one or more processing nodes 50 or distributed across the control system 34 (if present) and the one or more processing nodes 50 in any desired manner. In some particular embodiments, some or all of the functions 60 of the network node 32 described herein are implemented as virtual components executed by one or more virtual machines implemented in a virtual environment(s) hosted by the processing node(s) 50. As will be appreciated by one of ordinary skill in the art, additional signaling or communication between the processing node(s) 50 and the control system 34 (if present) or alternatively the radio unit(s) 42 (if present) is used in order to carry out at least some of the desired functions. Notably, in some embodiments, the control system 34 may not be included, in which case the radio unit(s) 42 (if present) communicates directly with the processing node(s) 50 via an appropriate network interface(s).

In some embodiments, a computer program including instructions which, when executed by the at least one processor 36, 54, causes the at least one processor 36, 54 to carry out the functionality of the network node 32 or a processing node 50 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 56.

The above described embodiments are intended to be examples only. Alterations, modifications and variations may be effected to the particular embodiments by those of skilled in the art without departing from the scope of the description, which is defined by the appended claims.

ABBREVIATIONS

The present description may comprise one or more of the following abbreviations:
3GPP Third Generation Partnership Project
5G Fifth Generation
ACK Acknowledgement
ASIC Application Specific Integrated Circuit
CC Chase Combining
CPU Central Processing Unit
CRC Cyclic Redundancy Check
DCI Downlink Control Information
DFT-SC-OFDM Discrete Fourier Transform Single Carrier Orthogonal Frequency Division Multiplexing
eMBB Enhanced Mobile Broadband
eNB Enhanced or Evolved Node B
FPGA Field Programmable Gate Array
gNB Base station in 5G network
HARQ Hybrid Automatic Repeat Request
IR Incremental Redundancy
LDPC Low-Density Parity-Check
LTE Long Term Evolution
MCS Modulation and Coding Scheme
MME Mobility Management Entity
MTC Machine Type Communication
NACK Negative Acknowledgement
NDI New Data Indicator
NR New Radio OFDM Orthogonal Frequency Division Multiplexing
PDCCH Physical Downlink Control Channel
PDN Packet Data Network
PDSCH Physical Downlink Shared Channel
P-GW Packet Data Network Gateway
RV Redundancy Version
SCEF Service Capability Exposure Function
SRS Sounding Reference Signal
TRP Transmission-Receive-Point
UE User Equipment
URLLC Ultra-Reliable and Low-Latency Communications

What is claimed is:

1. A method in a User Equipment (UE), the method comprising:
   obtaining parameters for a data transmission, the parameters including at least a number of layers, a number of allocated resource blocks, a modulation order and a code rate;
   determining an effective number of resource elements;
   determining a transmission data block size (TDBS) based on the obtained parameters and the determined effective number of resource elements and based on $$N_{PRB} \cdot N_{RE} \cdot v \cdot Q_m \cdot r$$

where $N_{PRB}$ is the number of allocated resource blocks, $N_{RE}$ is the number of effective resource elements, v is the number of layers, $Q_m$ is the modulation order and r is the code rate and the dot (·) is a scalar product; and
   performing one of transmitting and receiving data based on the determined transmission data block size.

2. The method of claim 1, wherein obtaining the parameters comprises receiving from a network node a signal comprising information related to the number of layers, the modulation order and the code rate and the number of allocated resource blocks.

3. The method of claim 1, wherein determining the effective number of resource elements is based at least on one or more of: a slot configuration, mini-slot configuration, control region configuration, reference symbol configuration, frequency division duplex and time division duplex.

4. The method of claim 1, wherein determining the effective number of resource elements comprises receiving, from a network node, an effective number of resource elements selected from a set of predefined effective numbers of resource elements by the network node.

5. The method of claim 4, wherein the selected effective number of resource elements is received via DCI.

6. The method of claim 1, wherein determining the effective number of resource elements comprises determining one or more of: a first effective number of resource elements for an uplink transmission, a second effective number of resource elements for a downlink transmission and a third number of resource elements for a sidelink transmission.

7. The method of claim 6, wherein determining the effective number of resource elements for the downlink transmission ($N_{RE}^{DL,PRB}$) comprises calculating:

$$N_{RE}^{DL,PRB} = 12 \times n_{OFDM} - N_{RE}^{PTRS}$$

where $n_{OFDM}$ is a number of OFDM symbols used for the data transmission, $N_{RE}^{PTRS}$ is an average number of resource elements per PRB used for Phase Tracking Reference Signal (PTRS), 12 refers to a number of subcarriers in a PRB.

8. The method of claim 1, further comprising adjusting the determined TDBS to be aligned with a size unit C, wherein adjusting the determined TDBS to be aligned with the size unit C comprises calculating:

$$C \times \left\lceil \frac{N_{PRB} \cdot N_{RE} \cdot v \cdot Q_m \cdot r}{C} \right\rceil$$

where $N_{PRB}$ is the number of allocated resource blocks, $N_{RE}$ is the number of effective resource elements, v is the number of layers, $Q_m$ is the modulation order and r is the code rate, and ⌈ ⌉ is a ceiling function.

9. The method of claim 8, wherein the size unit C is used to adjust the TDBS so that all code blocks are of equal size when the transmission data block is sub-divided into multiple code blocks.

10. The method of claim 1, wherein the effective number of resource elements comprises a number of resource elements per physical resource block (PRB).

11. A User Equipment (UE) comprising a network interface and a processing circuitry connected thereto, the processing circuitry comprising a processor and a memory connected thereto, the memory containing instructions that, when executed, cause the processor to:
    obtain parameters for a data transmission, the parameters including at least a number of layers, a number of allocated resource blocks, a modulation order and a code rate;
    determine an effective number of resource elements;
    determine a transmission data block size (TDBS) based on the obtained parameters and the determined effective number of resource elements and based on:

$$N_{PRB} \cdot N_{RE} \cdot v \cdot Q_m \cdot r$$

where $N_{PRB}$ is the number of allocated resource blocks, $N_{RE}$ is the number of effective resource elements, v is the number of layers, $Q_m$ is the modulation order and r is the code rate and the dot (·) is a scalar product; and
    perform one of transmit and receive data based on the determined transmission data block size.

12. The UE of claim 11, wherein the processor is further configured to receive from a network node a signal comprising information related to the number of layers, the modulation order and the code rate and the number of allocated resource blocks.

13. The UE of claim 12, wherein the information comprises Downlink Control information (DCI) and wherein the DCI comprises a Modulation Coding Scheme (MCS) field for indicating the modulation order and the code rate and wherein the MCS field comprises a MCS index, which is used by the UE to look up a MCS table to determine the modulation order and code rate.

14. The UE of claim 11, wherein the processor is further configured to determine the effective number of resource elements based at least on one or more of: a slot configuration, mini-slot configuration, control region configuration, reference symbol configuration, frequency division duplex and time division duplex.

15. The UE of claim 11, wherein the processor is further configured to receive, from a network node, an effective number of resource elements selected from a set of predefined effective numbers of resource elements.

16. The UE of claim 15, wherein the processor is further configured to receive the selected effective number of resource elements via DCI.

17. The UE of claim 11, wherein the processor is further configured to determine one or more of: a first effective number of resource elements for an uplink transmission, a second effective number of resource elements for a downlink transmission and a third number of resource elements for a sidelink transmission.

18. The UE of claim 17, wherein the processor is further configured to determine the effective number of resource elements for the downlink transmission ($N_{RE}^{DL,PRB}$) by calculating:

$$N_{RE}^{DL,PRB} = 12 \times n_{OFDM} - N_{RE}^{PTRS}$$

where $n_{OFDM}$ is a number of OFDM symbols used for the data transmission, $N_{RE}^{PTRS}$ is an average number of resource elements per PRB used for Phase Tracking Reference Signal (PTRS), 12 refers to a number of subcarriers in a PRB.

19. The UE of claim 11, wherein the processor is further configured to adjust the determined TDBS to be aligned with a size unit.

20. The UE of claim 19, wherein the processor is further configured to adjust the determined TDBS to be aligned with a size unit C by calculating:

$$C \times \left\lceil \frac{N_{PRB} \cdot N_{RE} \cdot v \cdot Q_m \cdot r}{C} \right\rceil$$

where $N_{PRB}$ is the number of allocated resource blocks, $N_{RE}$ is the number of effective resource elements, v is the number of layers, $Q_m$ is the modulation order and r is the code rate, and $\lceil\ \rceil$ is a ceiling function.

21. The UE of claim 20, wherein the size unit C is used to adjust the TDBS so that all code blocks are of equal size when the transport data block is sub-divided into multiple code blocks.

22. The UE of claim 11, wherein the effective number of resource elements comprises an effective number of resource elements per physical resource block (PRB).

23. The UE of claim 11, wherein the processor is further configured to determine an effective number of resource elements per time-domain symbol per PRB.

24. The UE of claim 23, wherein the processor is further configured to determine the transmission data block size based on the obtained parameters and the determined effective number of resource elements by calculating:

$$N_{PRB} \cdot N_{symb} \cdot N_{RE}^{symb} \cdot v \cdot Q_m \cdot r$$

where $N_{PRB}$ is the number of allocated resource blocks, $N_{RE}^{symb}$ is the number of effective resource elements per symbol per PRB, v is the number of layers, $Q_m$ is the modulation order, r is the code rate and $N_{symb}$ is a number of allocated time-domain symbols.

25. The UE of claim 24, wherein the processor is further configured to adapt the determined TDB S to be aligned with a size unit.

26. The UE of claim 11, wherein the processor is further configured to receive from a network node a signal comprising information related to the modulation order and the code rate and the number of allocated resource blocks and wherein the number of layers is predefined.

27. A network node comprising a network interface and a processing circuitry connected thereto, the processing circuitry configured to:
 transmit parameters for a data transmission, the parameters including a number of layers, a number of allocated resource blocks, a modulation order and a code rate;
 transmit an effective number of resource elements; and
 perform one of receive and transmit data based on a transmission data block size, which is determined based on the transmitted parameters and effective number of resource elements and based on:

$$N_{PRB} \cdot N_{RE} \cdot v \cdot Q_m \cdot r$$

where $N_{PRB}$ is the number of allocated resource blocks, $N_{RE}$ is the number of effective resource elements, v is the number of layers, $Q_m$ is the modulation order and r is the code rate and the dot ($\cdot$) is a scalar product.

28. The network node of claim 27, wherein the processor is configured to select an effective number of resource elements from a set of predefined effective number of resource elements prior to transmitting the effective number of resource elements.

* * * * *

UNITED STATES PATENT AND TRADEMARK OFFICE
CERTIFICATE OF CORRECTION

PATENT NO. : 10,491,348 B2
APPLICATION NO. : 16/226346
DATED : November 26, 2019
INVENTOR(S) : Cheng et al.

It is certified that error appears in the above-identified patent and that said Letters Patent is hereby corrected as shown below:

On the Title Page

In Item (73), under "Assignee", in Column 1, Line 1, delete "Telefonaktiebolaget LM Ericsson," and insert -- Telefonaktiebolaget LM Ericsson (Publ), --, therefor.

In the Drawings

In Fig. 3, Sheet 5 of 12, for Step "104", in Line 1, delete "TDSB" and insert -- TDBS --, therefor.

In Fig. 3, Sheet 5 of 12, for Step "108", in Line 2, delete "ACCES" and insert -- ACCESS --, therefor.

In the Specification

In Column 4, Line 41, delete "entries" and insert -- entries in --, therefor.

In Column 5, Line 38, delete "by an" and insert -- by a --, therefor.

In Column 9, Line 21, delete "TDSB" and insert -- TDBS --, therefor.

In Column 9, Line 39, delete "ELEMENTS" and insert -- ELEMENTS. --, therefor.

In Column 13, Line 24, delete "$I_{DataStop}$." and insert -- $I_{DataStop}$, --, therefor.

In Column 15, Line 65, delete "TDB S" and insert -- TDBS --, therefor.

In the Claims

In Column 22, Line 13, in Claim 25, delete "TDB S" and insert -- TDBS --, therefor.

Signed and Sealed this
Eighteenth Day of August, 2020

Andrei Iancu
*Director of the United States Patent and Trademark Office*